Nov. 25, 1958 G. F. HAUSMANN 2,861,419
VARIABLE BLEED DIFFUSER
Filed Feb. 13, 1953 3 Sheets-Sheet 1

FUEL UNDER PRESSURE

INVENTOR
GEORGE F. HAUSMANN
BY
ATTORNEY

Nov. 25, 1958 G. F. HAUSMANN 2,861,419
VARIABLE BLEED DIFFUSER
Filed Feb. 13, 1953 3 Sheets-Sheet 2

INVENTOR
GEORGE F. HAUSMANN
BY
ATTORNEY

Nov. 25, 1958 G. F. HAUSMANN 2,861,419
VARIABLE BLEED DIFFUSER
Filed Feb. 13, 1953 3 Sheets-Sheet 3

INVENTOR
GEORGE F. HAUSMANN
BY *Leonard F. Weklund*
ATTORNEY

United States Patent Office 2,861,419
Patented Nov. 25, 1958

2,861,419

VARIABLE BLEED DIFFUSER

George F. Hausmann, Windsor, Conn., assignor to United Aircraft Corporation, East Hartford, Conn., a corporation of Delaware Application February 13, 1953, Serial No. 336,746

8 Claims. (Cl. 60—35.6)

This invention relates to diffusers and more particularly to convergent-divergent supersonic diffusers for ramjet engines.

It is an object of this invention to provide a mechanism for bleeding air from a convergent-divergent supersonic diffuser to permit the swallowing of the shock therein.

It is a further object of this invention to provide a bleed mechanism for a supersonic diffuser including a control to vary the amount of air being bled from the diffuser.

These and other objects will become readily apparent from the following detail description of the drawings in which.

In starting ramjet power plants for vehicles adapted to operate at supersonic velocities a problem arises in obtaining the proper flow conditions through the diffuser of the ramjet power plant. For example, the entrance to the convergent-divergent diffuser at lower supersonic velocities will have a detached shock forward thereof until higher supersonic velocities are attained. At this time the shock will tend to attach itself to the periphery of the entrance or the forwardmost part of the power plant. At these higher velocities it is desirable to have the shock swallowed within the power plant so that a maximum efficiency of ram compression within the diffuser is obtained. For cases where the convergence of the diffuser is high, a portion of the fluid must be bled outboard of the diffuser to position the normal shock at or near the throat of the diffuser where the total pressure losses are minimized. This invention relates to a mechanism for obtaining the desirable results mentioned.

Figure 1:
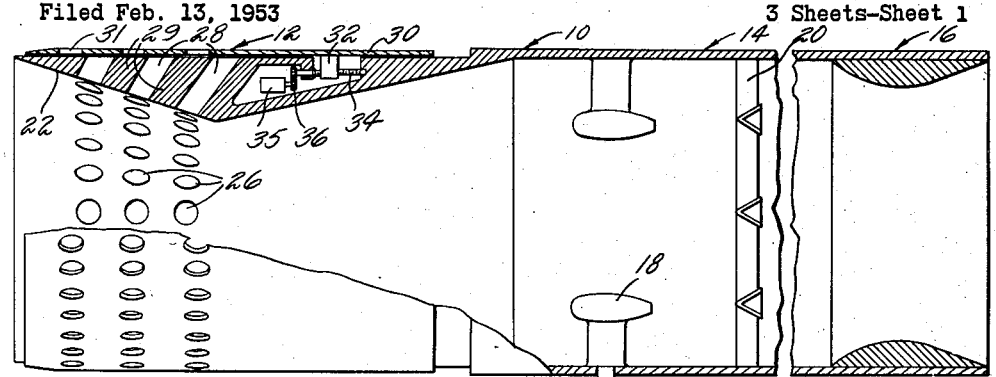
Fig. 1 is a partial cross-sectional view of a typical ramjet power plant having a variable bleed diffuser.

Referring to Fig. 1, a ramjet power plant 10 is illustrated which power plant itself can be a vehicle to be propelled. The ramjet comprises a diffuser 12, a combustion section 14 and an exhaust nozzle 16. Fuel may be admitted to the combustion chamber 14 by means of a plurality of nozzles 18. A flameholder 20 is provided to stabilize the flame once the fuel has been ignited by any suitable means.

The diffuser portion 12 comprises a converging section 22 and a diverging section 24. In order to obtain maximum efficiency of the diffuser 12 it is desirable that a normal shock be positioned adjacent the area of the minimum diameter or throat of the diffuser. Thus, supersonic velocities will exist in the converging portion of the diffuser and subsonic velocities (behind the normal shock) will exist in the diverging portion of the diffuser. Hence the air will be compressed throughout the diffuser section. In order to improve the efficiency of compression and to permit the shock to be swallowed to the throat of the diffuser 12, a plurality of openings or perforations 26 are provided in the walls of the converging portion 22 of the diffuser 12. As shown herein, a plurality of passages 28 radiate from the perforations 26 and are formed by baffles or walls 29.

It is desirable to bleed air from the diffuser to permit the swallowing of the shock but once the shock has been positioned it is preferable that little or no further bleeding occurs since this represents a loss of thrust once the proper flow conditions have been established. To this end, a cylindrical sleeve 30 is provided with a plurality of openings or perforations 31 which cooperate with the passages 28. The sleeve 30 is movable fore and aft so that the openings 31 can be aligned with the passages 28 or the passages 28 can be closed. The sleeve 30 is provided with a depending member 32 which can be moved by a screw thread 34 adapted to be driven by a motor 35 through gear 36.

The openings 31 in the sleeve 30 can be arranged so that when the sleeve 30 is moved to the closed position each of the passages 28 are completely covered. If desirable, one or more rows of the openings 26 in passages 28 may be left slightly open to insure that the normal shock does not move forward of the throat of the diffuser or to bleed low pressure boundary layer air and thereby improve the efficiency of compression.

In order to control the movements of the sleeve 30 it may be desirable to automatically move the sleeve when the particular vehicle attains, for example, a given Mach number. Thus, for example, the characteristics of the power plant may be designed or known to operate properly at a given Mach number or within a certain range of Mach numbers. A mechanism for controlling the movements of the sleeve 30 in response to the attaining of a predetermined Mach number is illustrated in Fig. 2.

Figure 2:
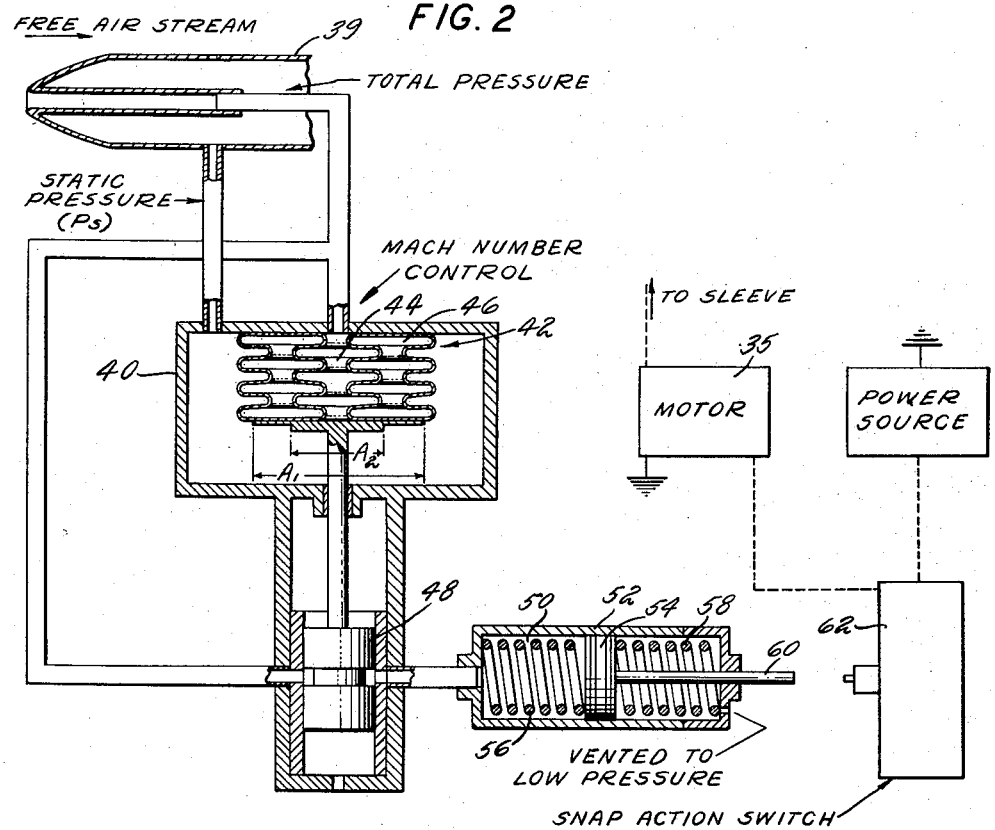
Fig. 2 is a schematic illustration of the control for the variable bleed mechanism.

Referring to Fig. 2, the Mach number control comprises a sealed container 40 into which is admitted the static pressure of the surrounding atmosphere by means of a Pitot tube 39. A double walled bellows 42 is carried within the container 40 and includes an inner expansible chamber 44 and an outer chamber 46. The inner chamber 44 communicates with the total pressure line of the Pitot tube. The outer expansible chamber 46 is evacuated. Therefore, it is apparent that the movable wall of the double bellows will be responsive on its outer side to static pressure ($P_S$) and the pressure will react against the area $A_1$. But the inside of the movable bellows wall will be exposed to the total pressure ($P_T$) acting over the smaller area $A_2$. This is the usual construction for a Mach sensing device.

In supersonic flight the Pitot tube 39 under operative conditions will have a detached shock ahead of the entrance. The air flow ahead and behind the shock will have different pressure characteristics. For any given relative free stream flow Mach number the total pressure behind the shock will be less than that ahead of the shock. The Pitot-static pickup will be sensing the total pressure behind the shock and a static pressure which is equal to that ahead of the shock. There is a constant value of the ratio between total and static pressures for any given flight Mach number and a constant value of the ratio between the total pressure ahead of and behind the shock. For example, if the desired missile Mach number were 2.0, under standard conditions the pressure ratio can be computed. Thus $$\frac{P_{\text{Total behind shock}}}{P_{\text{Static}}} = 5.6404 \text{ at flight } M=2$$

This intelligence is then imposed upon the bellows as described in connection with Fig. 2.

Then $$P_S \times A_1 = P_T \times A_2$$

and $$\frac{P_T}{P_S} = \frac{A_2}{A_1} = K = 5.6404 \text{ for } M = 2$$

The pilot valve 48 is connected to the bellows such that the neutral position of the pilot valve is obtained when $P_T/P_S = 5.6404$.

When the ratio of total pressure to static pressure reaches the value given above, the pilot valve 48 will move to the position shown in Fig. 2. This will admit pressure to the chamber 50 of a servo motor 52 which includes a movable piston 54 balanced by springs 56 and 58, respectively. Upon admission of pressure to the chamber 50 the piston 54 will be moved to the right so that the piston rod 60 can trip snap-action switch 62. The switch 62 will then provide power for the motor 35 to move the sleeve as desired. The Mach control herein shown would normally operate to move the sleeve toward a no bleed position upon attainment of the desired Mach number.

Figure 3:
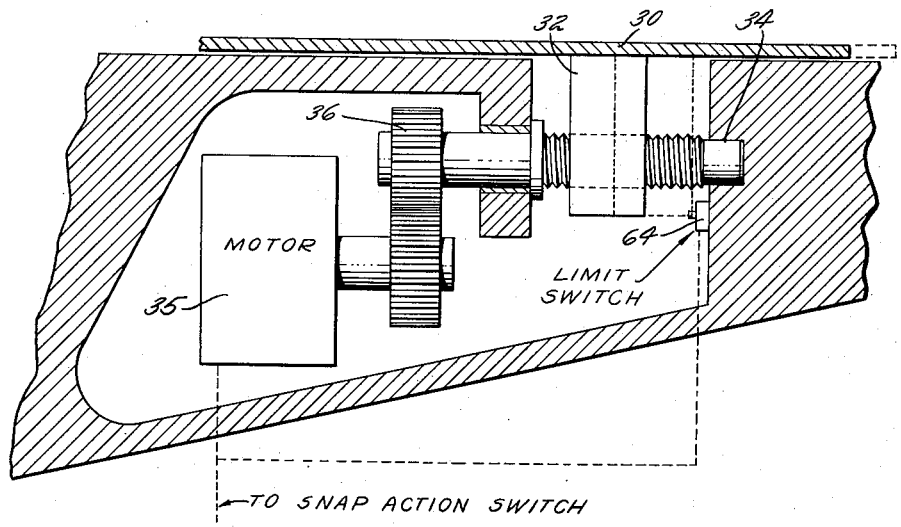
Figs. 3 and 4 illustrate in detail mechanisms for operating the variable bleed mechanism.

As shown in detail in Fig. 3, the motor 35 upon being actuated would turn the gears 36 and the screw thread 34 so as to move the element 32 and the sleeve 30 to the dotted line position illustrated. A limit switch 64 may be provided so that upon reaching the dotted line position the depending element 32 may trip the switch to stop the operation of the motor 35.

Figure 4:
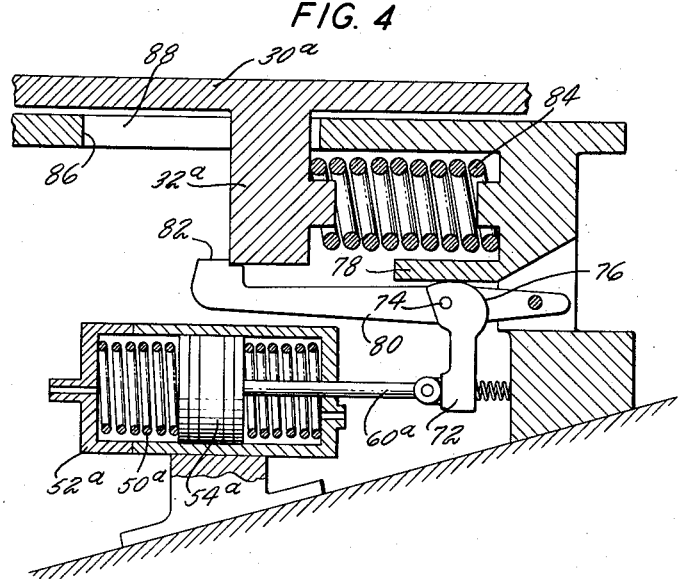

A slightly modified mechanism is illustrated in Fig. 4. Herein a servo motor 52a is shown which may correspond to the servo motor 52 shown in Fig. 2. Thus when the pilot valve 48 of Fig. 2 is properly positioned, air under pressure would be admitted to the chamber 50a of Fig. 4 to move the piston 54a as well as the piston rod 60a toward the right against the free end of arm 72. The arm 72 may be pivoted at 74 and has a cam portion 76. Upon movement of the arm 72 toward the right, the cam portion 76 bears against the fixed flange 78 so as to force the pivoted arm 80 downwardly. This movement of the pivoted arm 80 causes the free end 82 of the arm 80 to become disengaged from the depending member 32a of the sleeve 30a. A compressed spring 84 will then move the sleeve 30a toward the left until the depending member 32a engages the abutment 86 forming one end of a slot 88. As shown in Fig. 4, the sleeve 30a would be in the position to permit air to be bled from the diffuser so that when the mechanism is tripped the sleeve 30a would be moved toward the left to close the passages 28 shown in Fig. 1.

Figure 5:
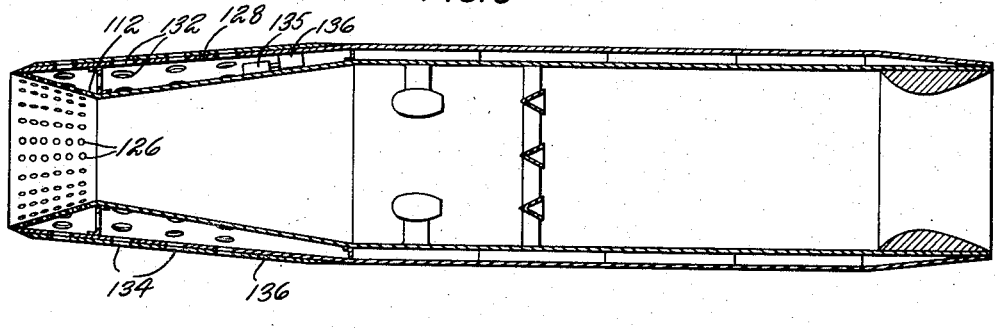
Figs. 5 through 7 are cross-sectional and partial perspective illustrations of another form of bleed mechanism.
Figure 6:
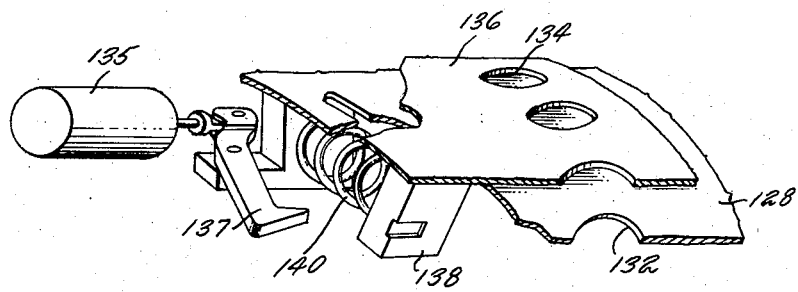
Figure 7:
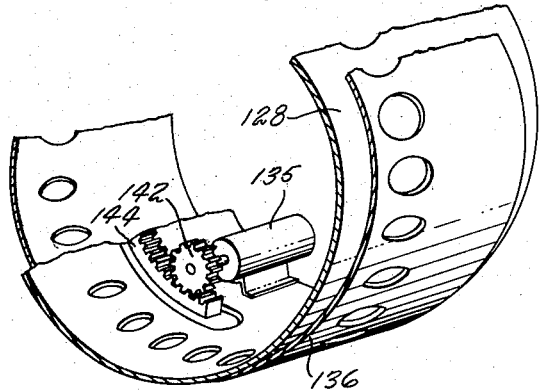

Figs. 5 through 7 illustrate a modified form of bleed mechanism. Fig. 5 shows a ramjet power plant substantially identical to that shown in Fig. 1. However, perforations 126 are provided in the converging portion of the diffuser 112 and an outer wall 128 is spaced from the walls of the diffuser. The outer wall 128 includes a plurality of openings 132 which cooperate with openings 134 of the sleeve 136. The sleeve 136 in this modification is rotatable about the axis of the power plant by means of a motor 135 and a mechanism 136. Here again the mechanism 136 may take the form as shown either in Fig. 6 or in Fig. 7.

In Fig. 6 the motor 135 may be operated to move a latching member 137 out of engagement with a depending member 138 so as to permit a spring 140 to move the sleeve 136 about the axis of the power plant so as to close off the openings 132 shown in Fig. 5 to prevent any further bleeding of air from the diffuser.

The motor 135, as shown in Fig. 7, may be adapted to operate a gear 142 which in turn engages a rack 144 for rotating the outer sleeve 136. Here again a control similar to that illustrated in Figs. 2 and 3 may be utilized to initiate movement of the sleeve and to stop the movement thereof.

As a result of this invention it is apparent that a simple yet highly practical means has been provided for controlling the bleeding of air from diffusers for ramjets. Furthermore, the mechanism disclosed can operate automatically at any desirable Mach number.

Although only certain embodiments of this invention have been illustrated and described herein, it will be apparent that various changes and modifications may be made in the construction and arrangement of the various parts without departing from the scope of this novel concept.

What it is desired to obtain by Letters Patent is:

1. A convergent-divergent supersonic diffuser adapted to operate in a free airstream of relative supersonic velocity and having a portion of the stream flowing therethrough, said diffuser including a plurality of passages in the wall of the convergent portion of the diffuser, means for progressively closing said passages to prevent flow therethrough, and a Mach number responsive mechanism for moving said closing means including a probe located externally of the diffuser and sensing at least the total pressure of the free airstream.

2. In a vehicle having a ramjet power plant adapted to operate in an airstream of relative supersonic velocities, said power plant including a convergent-divergent diffuser receiving air from the airstream, a combustion chamber receiving air from the diffuser, means for bleeding air from internally of said diffuser to a point externally thereof comprising a plurality of passages in the wall of the convergent portion of the diffuser, at least one member movable with respect to said passages to close said passages, means for moving said movable member, and means for controlling said moving means including a Mach number meter operatively connected thereto and a probe exposed to the free airstream externally of the power plant and connected to said meter.

3. In a vehicle having a ramjet power plant, said power plant including a convergent-divergent diffuser receiving air from the airstream, a combustion chamber receiving air from the diffuser, means for bleeding air from internally of said diffuser to a point externally thereof comprising a plurality of passages in the wall of the convergent portion of the diffuser, at least one member movable with respect to said passages to close said passages, means for moving said movable member, and means for controlling said moving means including a Mach number meter operatively connected thereto, said meter having a device for sensing the total pressure of the free airstream and including a pressure sensing probe exposed to the free airstream, a servo motor operatively connected to and controlled by said meter, and an operative connection between said servo motor and said moving means.

4. In a ramjet power plant for a supersonic vehicle, a convergent-divergent diffuser, means for inducing the swallowing of shock at supersonic velocities comprising bleed means in the convergent portion of said diffuser for bleeding a portion of the air in said diffuser outside thereof, means for controlling the amount of air bled by said bleed means comprising a movable member operatively connected to said diffuser including at least one opening therein, means for moving said movable member, and means for controlling said movable member including a device responsive to the Mach number of the vehicle, said device including pressure responsive elements and a probe exposed to free stream and sensing the total pressure thereof.

5. In a ramjet according to claim 4 including a pilot valve operatively connected to said elements and a servo motor controlled by said valve and operatively connected to said moving means.

6. In a ramjet power plant for a supersonic vehicle, a convergent-divergent diffuser, means for inducing the swallowing of shock at supersonic velocities comprising bleed means in the convergent portion of said diffuser for bleeding a portion of the air in said diffuser outside thereof, means for controlling the amount of air bled by said bleed means comprising a movable member operatively connected to said diffuser including at least one opening therein, means for moving said movable member, and means for controlling said movable member including a device responsive to the Mach number of the vehicle, said device including pressure responsive elements, a pilot valve operatively connected to said elements, a servo motor controlled by said pilot valve, and a tripping device for energizing said moving means.

7. In a ramjet power plant for a supersonic vehicle, a convergent-divergent diffuser, means for inducing the swallowing of shock at supersonic velocities comprising bleed means in the convergent portion of said diffuser for bleeding a portion of the air in said diffuser outside thereof, means for controlling the amount of air bled by said bleed means comprising a movable member operatively connected to said diffuser including at least one opening therein, means for moving said movable member, means for supplying power to said moving means and means for controlling said movable member including a device responsive to the Mach number of the vehicle and operatively connected to said power supplying means.

8. A claim according to claim 7 wherein said means for supplying power comprises a compressed spring and said device includes mechanism for tripping said spring and releasing its compression.

References Cited in the file of this patent

UNITED STATES PATENTS

| | | |
|---|---|---|
| 2,418,488 | Thompson | Apr. 8, 1947 |
| 2,540,594 | Price | Feb. 6, 1951 |
| 2,589,945 | Leduc | Mar. 18, 1952 |
| 2,705,863 | Clark et al. | Apr. 12, 1955 |

FOREIGN PATENTS

| | | |
|---|---|---|
| 614,548 | Great Britain | Dec. 17, 1948 |